United States Patent
Gillett, Jr. et al.

(10) Patent No.: US 6,295,585 B1
(45) Date of Patent: *Sep. 25, 2001

(54) HIGH-PERFORMANCE COMMUNICATION METHOD AND APPARATUS FOR WRITE-ONLY NETWORKS

(75) Inventors: Richard B. Gillett, Jr., Westford; Glenn P. Garvey, Harvard, both of MA (US); Simon C. Steely, Jr., Hudson, NH (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/482,925

(22) Filed: Jun. 7, 1995

(51) Int. Cl.$^7$ ...................................................... G06F 13/14
(52) U.S. Cl. ......................... 711/148; 711/141; 711/162; 709/216; 710/54
(58) Field of Search ..................................... 395/725, 471, 395/482, 800.29, 448; 340/172.5; 364/300, 200, 243, 131, 134; 709/214, 400, 216; 710/105, 54; 711/214, 148, 121, 400

(56) References Cited

U.S. PATENT DOCUMENTS

| | | | |
|---|---|---|---|
| 4,007,450 | * | 2/1977 | Haibt et al. ...................... 340/172.5 |
| 4,432,057 | * | 2/1984 | Daniell et al. ..................... 364/300 |
| 4,829,422 | * | 5/1989 | Morton et al. ..................... 364/200 |
| 4,991,079 | | 2/1991 | Dann et al. ........................ 364/200 |
| 5,113,510 | * | 5/1992 | Hills .................................. 711/121 |

(List continued on next page.)

OTHER PUBLICATIONS

Carl J. Beckmann, et al., "Fast Barrier Synchronization Hardware", Super Computing Conference, Nov. 12–16, 1990, pp. 180–189.

John M. Mellor—Crummey, et al., "Synchronization Without Contention", Fourth International Conference on Architectural Support for Programming Languages and Operating Systems, Apr. 8–11, 1991, pp. 269–274.

James R. Goodman, et al., "Efficient Synchronization Primitives for Large–Scale Cache–Coherent Multiprocessors", Third International Conference on Architectural Support for Programming Languages and Operating Systems, Apr. 3–6, 1989, pp. 64–75.

Lucci et al; "Reflective Memory Multiprocessor", IEEE Electronic Library, pp. 85–94, 1/95.*

*Primary Examiner*—Majid Banankhah
(74) *Attorney, Agent, or Firm*—Hazmilton, Brook, Smith & Reynolds, P.C.

(57) ABSTRACT

A multi-node computer network includes a plurality of nodes coupled together via a data link. Each of the nodes includes a local memory, which further comprises a shared memory. Certain items of data that are to be shared by the nodes are stored in the shared portion of memory. Associated with each of the shared data items is a data structure. When a node sharing data with other nodes in the system seeks to modify the data, it transmits the modifications over the data link to the other nodes in the network. Each update is received in order by each node in the cluster. As part of the last transmission by the modifying node, an acknowledgement request is sent to the receiving nodes in the cluster. Each node that receives the acknowledgment request returns an acknowledgement to the sending node. The returned acknowledgement is written to the data structure associated with the shared data item. If there is an error during the transmission of the message, the receiving node does not transmit an acknowledgement, and the sending node is thereby notified that an error has occurred.

18 Claims, 15 Drawing Sheets

U.S. PATENT DOCUMENTS

| | | | |
|---|---|---|---|
| 5,117,350 | 5/1992 | Parrish et al. | 395/425 |
| 5,146,607 | 9/1992 | Sood et al. | 395/800 |
| 5,255,369 * | 10/1993 | Dann | 709/214 |
| 5,313,620 * | 5/1994 | Cohen et al. | 709/400 |
| 5,313,638 | 5/1994 | Ogle et al. | 395/725 |
| 5,317,749 * | 5/1994 | Dahlen | 395/725 |
| 5,469,558 * | 11/1995 | Lieberman et al. | 710/105 |
| 5,475,858 * | 12/1995 | Gupta et al. | 395/800.29 |
| 5,491,811 * | 2/1996 | Arimilli et al. | 395/471 |
| 5,535,365 * | 7/1996 | Barriuso et al. | 395/482 |
| 5,537,569 * | 7/1996 | Masubuchi | 395/448 |
| 5,584,017 * | 12/1996 | Pierce et al. | 364/243.41 |
| 5,588,132 * | 12/1996 | Cardoza | 711/148 |
| 5,903,763 * | 5/1999 | Takahashi | 711/148 |

* cited by examiner

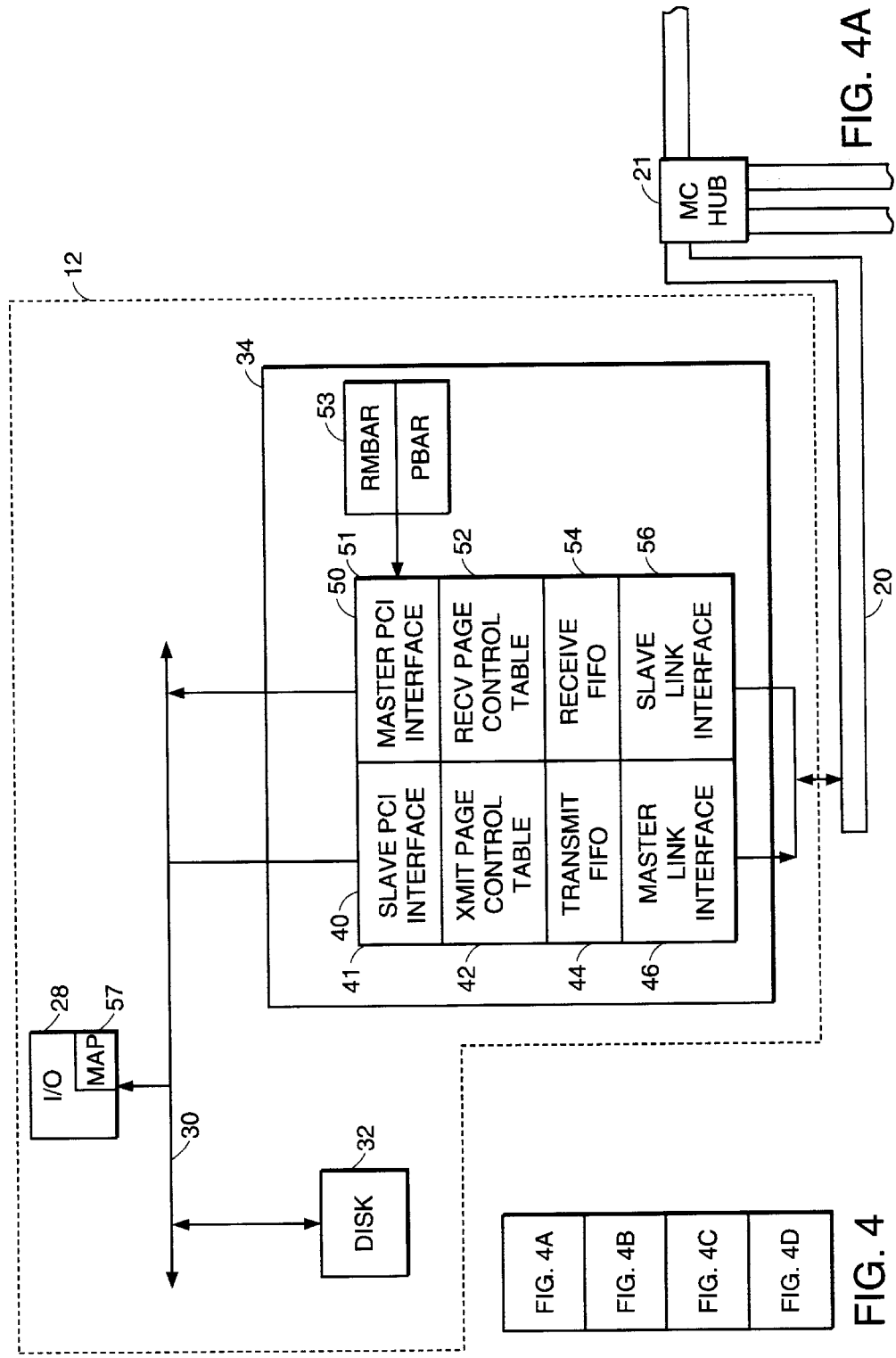

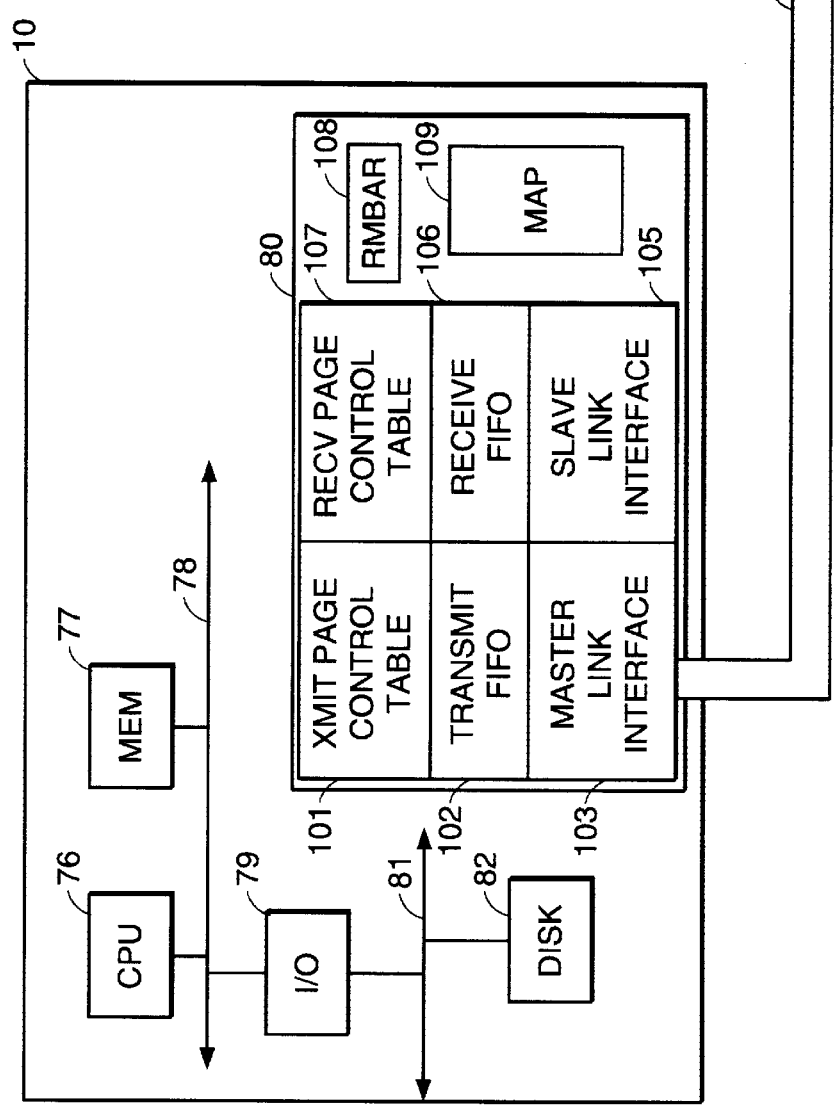
FIG. 7A1

FIG. 7A2

RM (LINK) PACKET FORMAT

| CYCLE | | LINK AD <31:24> | LINK AD <23:16> | LINK AD <15:08> | LINK AD <07:00> | LINK AD BM<3:0> | LINK PARITY | DV H/L |
|---|---|---|---|---|---|---|---|---|
| IDLE | C0 | x | x | x | x | x | x | 01 |
| RM HEADER | C1 | CONTROL Bdcr<24> Loopbk<25> AckReq<26> | XMIT/ SOURCE ID | RECV/ DESTINATION ID | ADR <39:32> | RESERVED SHOULD WE DEFINE 0000 AS NORMAL AND 1111 AS TEST? | hpar | 10 |
| ADDRESS | C2 | ADR <32:24> | ADR <23:16> | ADR <15:08> | ADR <07:00> | PCI COMMAND | hpar | 10 |
| DATA 0 | C3 | DATA 0 <32:24> | DATA 0 <23:16> | DATA 0 <15:08> | DATA 0 <07:00> | BYTE MASK <3:0> | hpar | 10 |
| DATA 1 | | DATA 1 <32:24> | DATA 1 <23:16> | DATA 1 <15:08> | DATA 1 <07:00> | BYTE MASK <3:0> | hpar | 10 |
| ... | | ... | ... | ... | ... | ... | | |
| DATA n | Cn | DATA n <32:24> | DATA n <23:16> | DATA n <15:08> | DATA n <07:00> | BYTE MASK <3:0> | hpar | 10 |
| VERTICAL PARITY | Cn+1 | VERT PARITY <32:24> | VERT PARITY <23:16> | VERT PARITY <15:08> | VERT PARITY <07:00> | VERT PARITY <3:0> | hpar | 01 |
| IDLE | | x | x | x | x | x | x | 01 |

FIG. 8

HIGH-PERFORMANCE COMMUNICATION METHOD AND APPARATUS FOR WRITE-ONLY NETWORKS

BACKGROUND OF THE INVENTION

This invention relates generally to the field of parallel computing and more particularly to a method of providing high performance recoverable communication between the nodes in a parallel computing system.

As it is known in the art, large scale parallel computers have historically been constructed with specialized processors and customized interconnects. The cost of building specialized processors in terms of components and time to market caused many computer manufacturers to re-evaluate system designs. Currently many vendors in the market are attempting to provide performance similar to that of custom designs using standard processors and standard networks. The standard processors and networks are generally marketed and sold as clustered computer systems.

By using standard components and networks, clustered systems have the advantage of providing a parallel computing system having a much lower cost design at a decreased time to market. However, because the standard network protocol is used, a communication overhead is incurred that translates into poor overall parallel system performance.

The source of much of the performance loss associated with standard networks arises because the currently existing network hardware is incapable of guaranteeing message delivery and order. Because these guarantees are not provided by network hardware, software solutions are required to detect and handle errors incurred during message transmission.

Network software typically comprises many layers of protocol. These network layers are executed by the operating system and work together in an attempt to detect dropped messages, transmission errors and to recover from the above events, among others. Because the operating system is linked to the network software, there is no provision for direct access by a given application program to the network. Accordingly, because there is no direct link between the application program and the network performance is further reduced due to the overhead of the network software interface.

One method for providing high performance communication was described in U.S. Pat. No. 4,991,079, entitled "Real-Time Data Processing System", by Danny et al, assigned to Encore Computer Corporation, issued on Feb. 5, 1991 (hereinafter referred to as the Encore patent).

The Encore patent describes a write-only reflective memory system that provides a form of networking better suited for parallel computing than standard networks, called a write-only reflective memory data link. The reflective memory system includes a real time data processing system in which each of a series of processing nodes is provided with its own data store partitioned into a local section and a section which is to be shared between the nodes. The nodes are interconnected by a data link. Whenever a node writes to an address in the shared portion of the data store, the written data is communicated (i.e. 'reflected') to all of the nodes via the data link. The data in each address of the shared data store can only be changed by one of the nodes which has been designated as a master node for the corresponding address. Because each address containing shared data can only be written to by one node, collisions between different nodes attempting to change a common item of data cannot occur.

The Encore system, although it describes a method for providing high performance parallel computing, provides no mechanism for ensuring recoverable communication. Accordingly, because there are no hardware mechanisms for providing error recovery, the support must still be provided by software. As a result, the Encore system incurs a similar communication overhead that translates into reduced parallel system performance.

SUMMARY OF THE INVENTION

The current invention provides an interconnect for parallel computing systems having high performance and recoverable communication in the presence of errors.

In accordance with one aspect of the invention, a method for providing shared memory in a network including a plurality of nodes coupled by a data link includes the steps of allocating a portion of memory at each of the plurality of nodes to provide a shared memory for storing a plurality of data items, wherein a subset of the data items of the shared memory are writable by a subset of the plurality of nodes. The method includes the step of maintaining, in the shared memory of each of the plurality of nodes, at least one data structure corresponding to at least one item of data to be shared by the corresponding node, the data structure comprising data item access information for each of a subset of the plurality of nodes sharing the data item. In accordance with another aspect of the invention, a network ed computer system includes a plurality of nodes coupled by a data link and a memory having a first and second portion, the first portion comprising a plurality of local memory portions, the second portion accessible by each of the plurality of nodes. The network ed computer system also includes means, coupled to said second portion of the memory, for storing a plurality of data items, each data item to be shared by a subset of the plurality of nodes. The network ed computer system further includes means for providing access to the each of the plurality of data items by the corresponding subset of nodes, where the means for providing access comprises, for each data item, a synchronization structure stored in the second portion of memory. With such an arrangement, multiple nodes in a cluster system may access a shared data item while maintaining coherency.

BRIEF DESCRIPTION OF THE DRAWINGS

The above-mentioned and other features of the invention will now become more apparent by reference to the following description taken in connection with the accompanying drawings in which:

FIG. 7A is a block diagram illustrating a second embodiment of interface logic for providing a network configuration such as that shown with regard to FIG. 1;

FIG. 8 illustrates the layout of a packet of information transmitted in the computer system of FIG. 7A and FIG. 4;

DESCRIPTION OF THE PREFERRED EMBODIMENT

Figure 1:
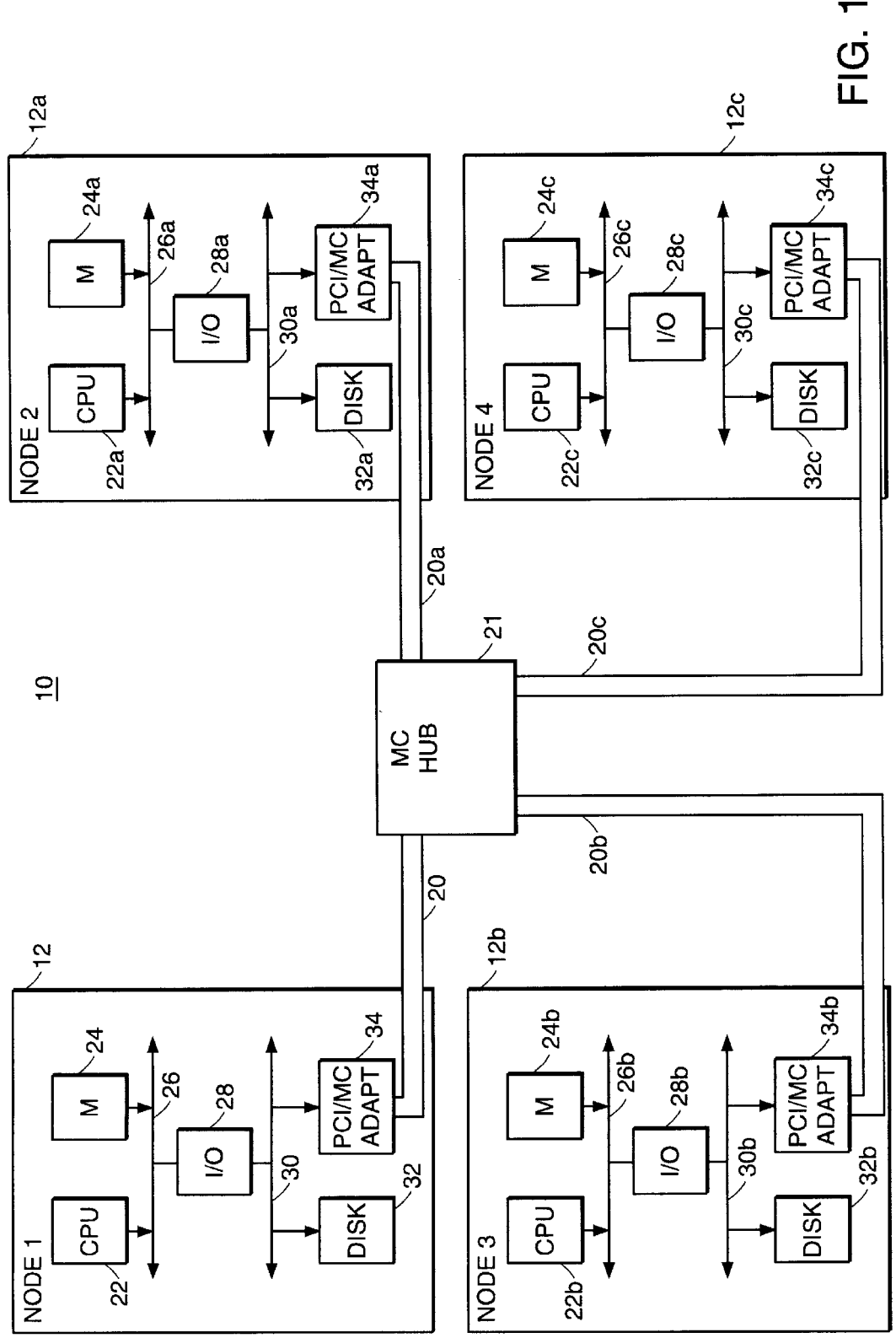
FIG. 1 is a block diagram of a network of nodes incorporating the present invention.

Referring now to FIG. 1, a Memory Channel™ (MC) network 10 of processing systems is shown to include a plurality of nodes 12, 14, 16, and 18, each coupled via a high speed network data link 20, 20a, 20b, and 20c, respectively to a MC Hub 21. The high speed data link is here 50 twisted-pair industry-standard cable, 3 meters in length, which links PHI-MC adapters of each of the nodes to the MC Hub 21. The MC Hub 21 is an eight port Memory Channel Hub, which will be described in greater detail later in the specification. Although each of the nodes 12, 14, 16 and 18 have been shown having identical internal components, it is to be understood that each node may be configured differently within the constraints of the invention as described herein. In addition, it should be understood that each node may include more than one processor, system bus and I/O device controlled by one operating system.

Each processor node, for example node 12, includes a central processing unit (CPU) 22 and a node memory 24 coupled to a local bus 26. An Input/Output (I/O) interface 28 is also coupled to the local bus 26. The I/O interface 28 is used to couple external devices that are coupled to a bus 30 to the node memory 24 and central processing unit 22. The bus 30 is here a high performance bus operating according to the Peripheral Chip Interface (PHI)™ bus protocol, and is hereafter referred to as the PHI bus 30. The PHI bus 30 is capable of transmitting data at a rate of up to 132 Mates/second.

A plurality of external devices may be coupled to the PHI bus 30, such as disk device 32, a printer interface (not shown), or a network interface (not shown). Also coupled to the PHI bus 30 is a PHI to Memory Channel™ (MC) adapter 34. The PHI to MC adapter 34 is used to interface the node 12 to the other nodes 14, 16, and 18 in the network 10 through the use of a memory mapped network protocol. Note that in FIG. 1, each of the PHI to MC adapters 34, 34a, 34b, and 34c are coupled to MC Hub 21, which provides for interconnectivity between each of the nodes. Such an arrangement allows each of the nodes to communicate with other nodes in the Memory Channel™ network 10 as described below.

The node memories 24, 24a, 24b and 24c are apportioned into at least two distinct portions. One portion of node memory is used to store data that is accessed only by the associated node, and is hereinafter referred to as the local memory portion. The second portion is used to store data that may be accessed by any node in the network. The second portion is hereinafter referred to as the network memory portion.

Figure 2:
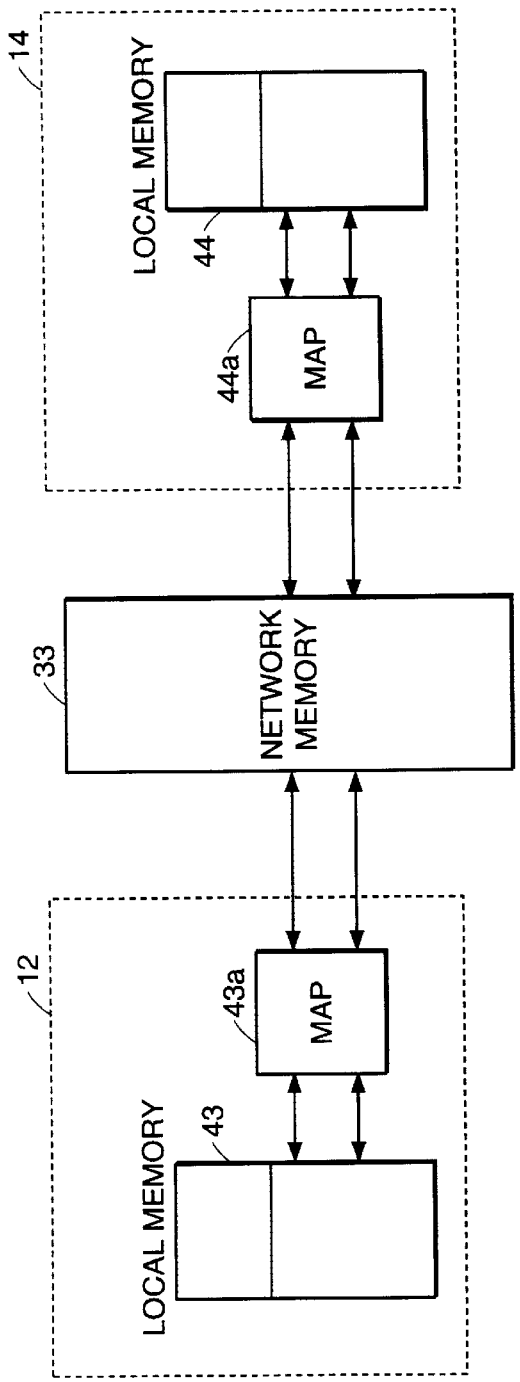
FIG. 2 is a block diagram illustrating the network memory interface used by the nodes in the network of FIG. 1.

Referring now to FIG. 2, the memory address spaces 43 and 44 of nodes 12 and 14, respectively are shown as discrete entities for illustrative purposes. The nodes 12 and 14 are outlined by dashed lines to indicate that not all of the elements of the node are shown. In addition, a network address space 33 is shown, where the network address space represents an addressable portion of memory which is to be shared by all of the nodes within the network. Coupled between each of the address spaces 43 and 44 and the network address space 33 are maps 43a and 44a respectively. Each map is used to translate node memory addresses into network addresses of network address space 33.

For example, writes to the shared portion of memory address space 43 are translated by map 43a to an address in network address space. The network address is translated by map 44a in node 14 to an address of the node memory of node 14. Accordingly, node 12 communicates with node 14 via writes its own MC address space. Similarly, writes to the shared portion of memory address space 44 by node 14 are translated by map 44a to an address in network address space 33. The network address is translated by map 43a of node 12 into a node memory address for node 12. Such an arrangement allows for communication between the CPU or external I/O devices of node 12 and the CPU or external I/O device of node 14 by providing memory-mapped connections which are established between the nodes.

Although FIG. 2 illustrates communication between two nodes, it should be understood that the present invention allows for communication between many nodes coupled together via a common data link while maintaining data coherency and consistency.

Figure 3:
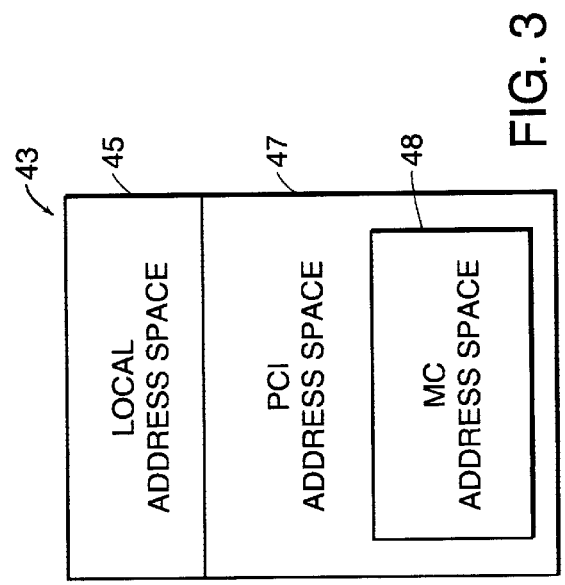
FIG. 3 is a block diagram illustrating the allocation of memory for each of the nodes in the network of FIG. 1.

Referring now to FIG. 3, memory space 43 of node 12 (representing the addressable locations of node memory 24) is shown in more detail to be divided into two portions of address space; local address space 45 and PCI address space 47. The local address space comprises addresses which are dedicated to processes running internal to node 12. The PCI address space 47 is address space that is reserved for references over the PCI bus to external devices. The PCI address space 47 is shown to include the Memory Channel (MC) address space 48. As discussed with reference to FIG. 2, the MC address space provides a vehicle for communication between nodes in the network. Although the MC address space is shown as a subset of the PCI data base, it should be understood that such an arrangement is not a requirement of the invention. Rather, any portion of the address space of the node may be reserved as the MC address space; i.e. the address space where writes to that address space trigger translations of the address to network address space.

The MC address space 48 of the PCI address space 47 is subdivided into a number 'N' of pages of data, where a page here is equivalent to 8K bytes of data. Thus, connection granularity between nodes in the network is at the page level. Certain nodes in the network receive data when the CPU writes to one of the N pages of MC address space. The determination of which nodes are mapped to which network addresses, i.e. the mapped connections, are determined at some point prior to when the nodes require data transfer. Connections may be point to point (from one sending node to only one destination node) or broadcast (from one sending node to many or all destination nodes).

Each node controls if, when, and where it exposes its MC address space to the network address space. This ability to isolate addresses is the basis for recovery from node failures; only a portion of the address space of the local node can be affected by the node failure.

Each node creates a mapped connection with other nodes at any point during operation of an application in a manner which will be described further below. The connection is advantageously controlled by the operating system of each node in order to assure protection and maintain security in the network. The overhead associated with creating the mapped connection is much higher than the cost of using the connection. Thus, once the connection is established it can be directly used by kernel and user processes. All that is required is that the MC address be mapped into the virtual space of the process. Thus the cost of transmitting data, in terms of complexity, is as low as the cost of a quadword memory operation.

Figure 4B:
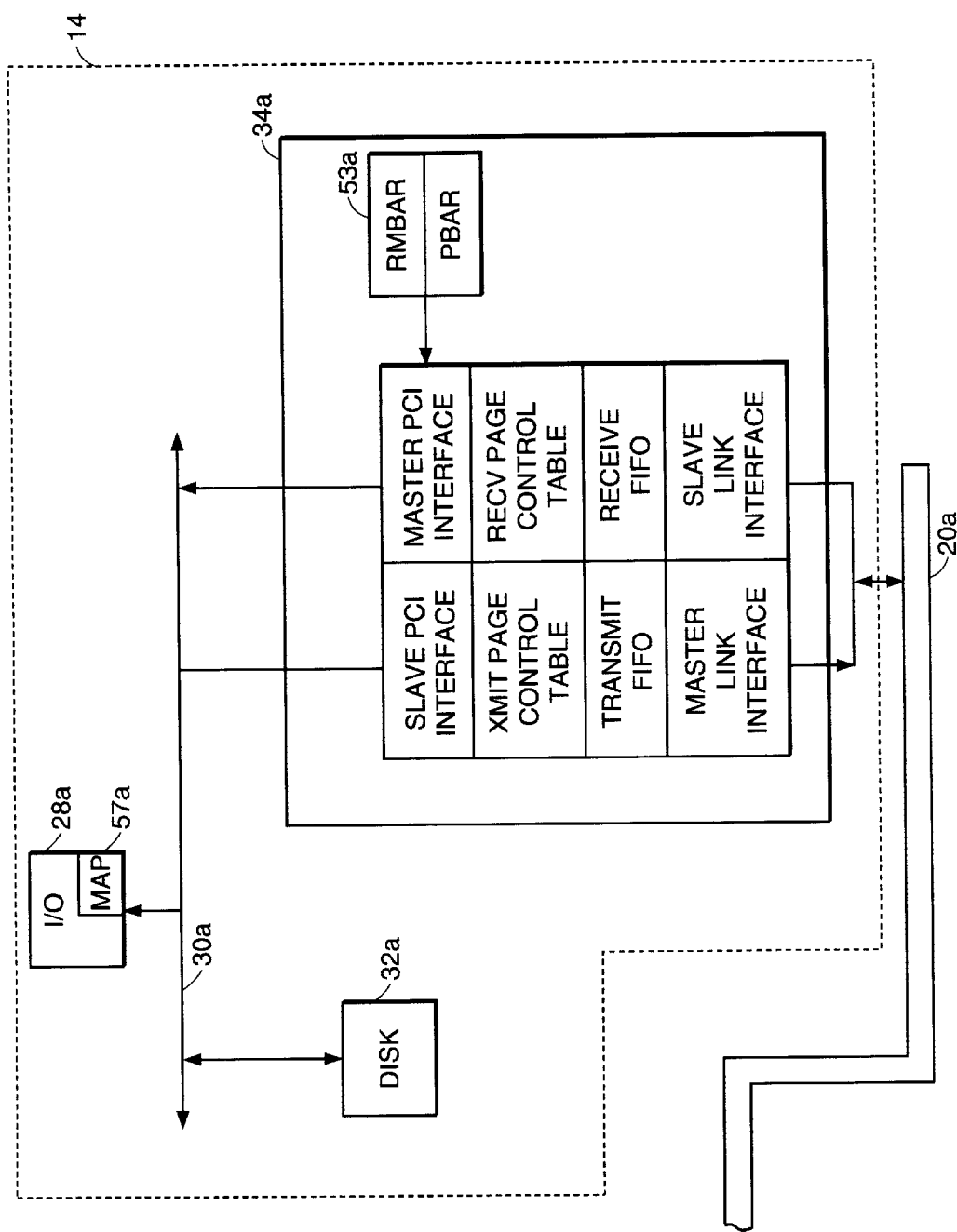
FIG. 4 is a block diagram illustrating the internal interface logic of each of the nodes of the network, including a more detailed illustration of one embodiment of the network of FIG. 1.
Figure 4C:
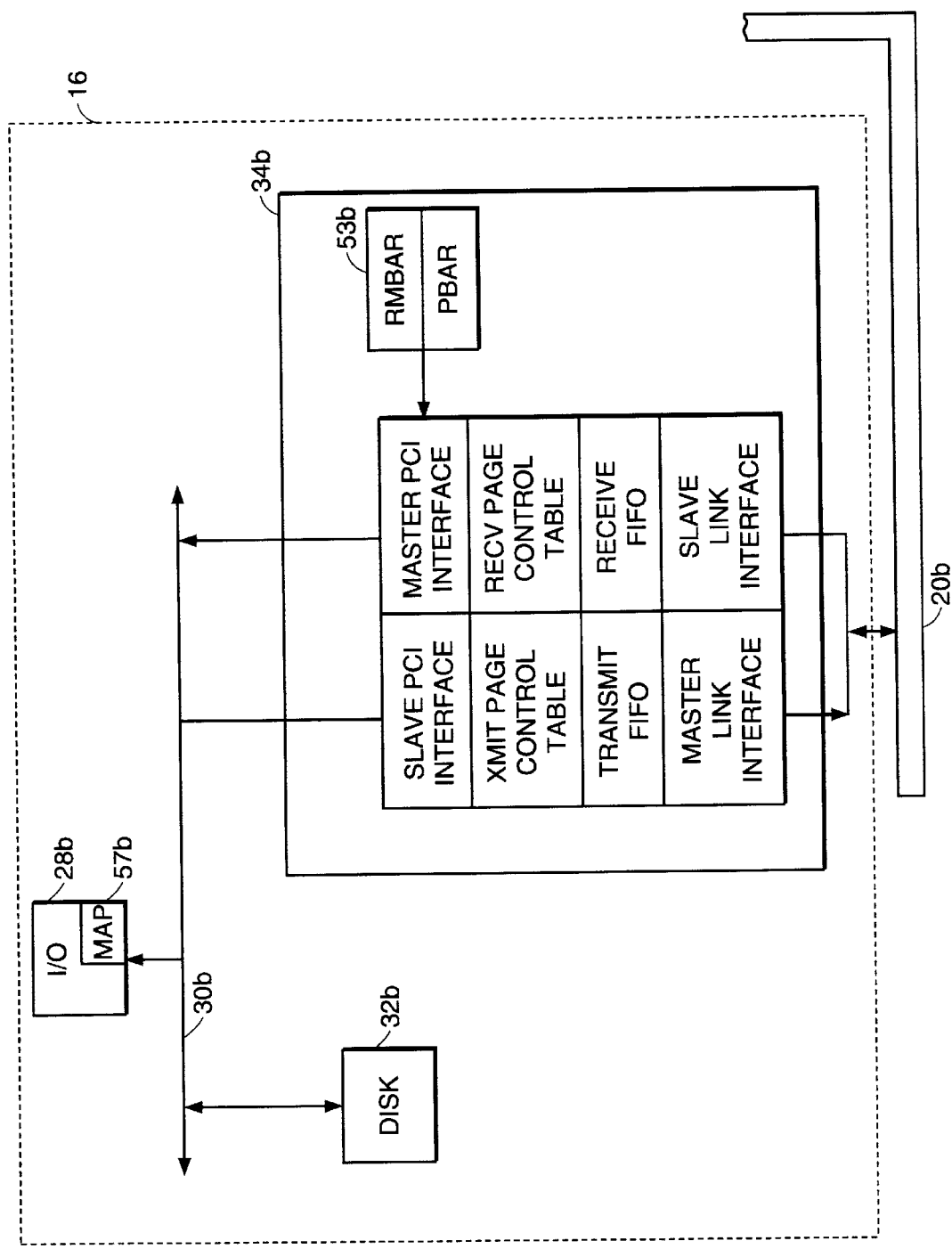
Figure 4D:
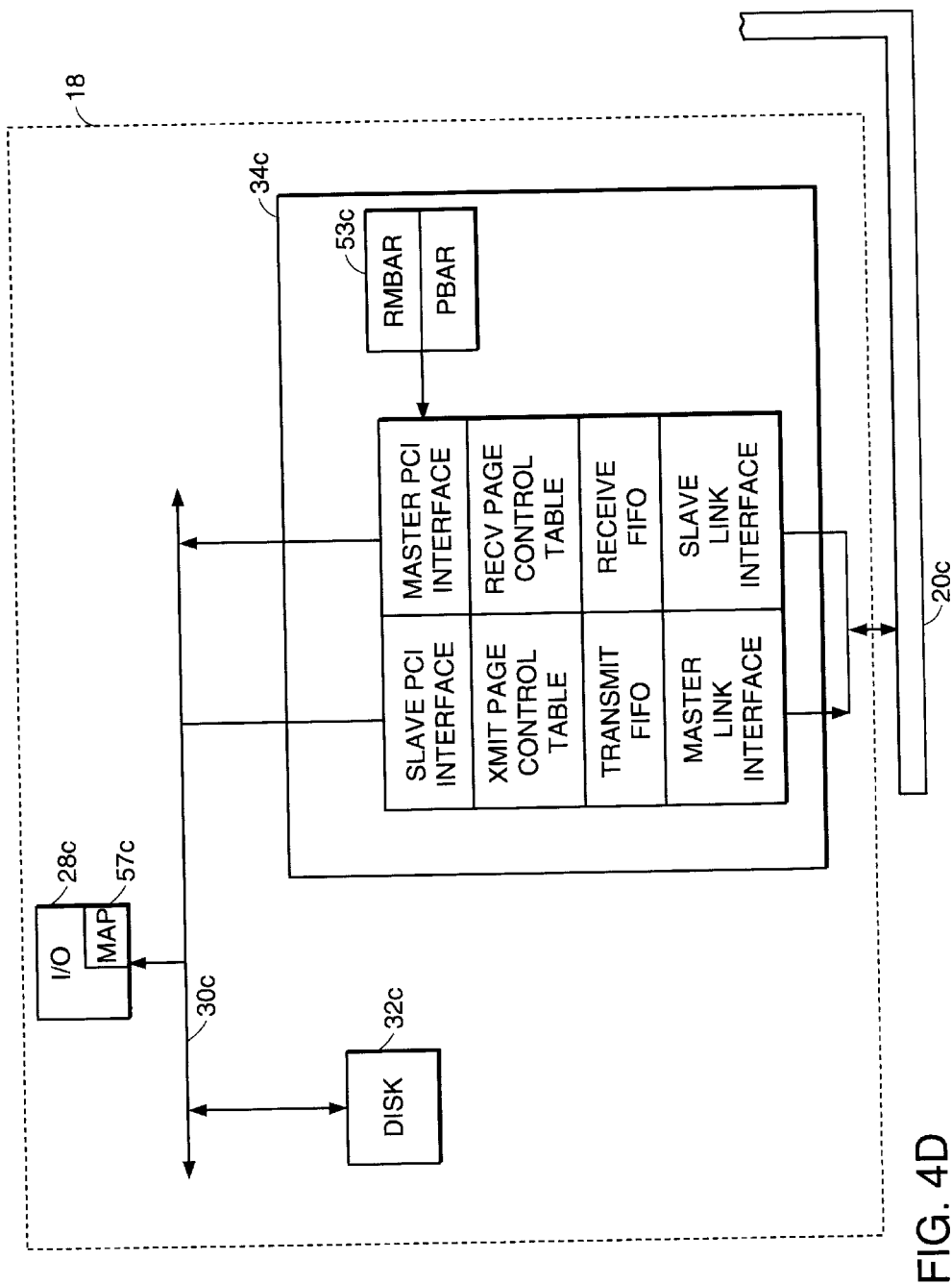

Referring now to FIG. 4, the components of the PCI to MC adapter are shown in greater detail. Although for purposes of clarity a 'MAP' element 43a was shown in FIG. 2, it is noted that in this embodiment the mapping functionality is divided into two distinct portions; one map portion for a transmit path 40 and one map portion for a receive path 50.

In the transmit path 40, the PCI to MC adapter includes a PCI interface 41, for translating local PCI space addresses into addresses for network address space 33. The transmit path also includes a Transmit Page control table 42. The transmit page control table comprises an entry for each address page, where each entry has a number of control bits for indicating how the corresponding pages are to be transmitted over data link 20. The transmit path 40 also includes a transmit fifo 44, which is a buffer operating under a first-in first-out design and is used to store pending write requests to data link 20. A transmit link interface 46 is an interface for controlling data transmission over the data link 20.

The receive path 50 includes a receive link interface 56, for controlling data reception from data link 20. The receive path also includes a receive fifo 54, operating under a first-in first-out protocol for buffering received writes from data link 20 until they are able to be handled by the PCI data link 25. The receive fifo 54 is coupled to provide received data to the Receive page control table 52. The receive page control table 52 includes control bits for each address page, where the control bits dictate the action to be taken by the node when received data is to be written to a corresponding page. The Receive page control table and the Receive fifo are coupled to a Receive PCI interface 51, which drives data onto PCI bus 30.

The PCI to MC adaptor also includes a MC base address register 53. The MC base address register 53 is initialized by software, and indicates the base address of the network address to be provided over data link 20. This base address is used to translate the PCI address to a network address that is common to all of the nodes in the network. The PCI to MC adaptor also includes a PCI base address register 59. The received MC address from data link 20 is added to the contents of the PCI base address register to form a PCI address for transmission onto PCI bus 30. This PCI address then either accesses other I/O devices or is translated via a memory map 57 in I/O interface 28 to form a physical address for accessing memory 24 (FIG. 1).

Figure 5:
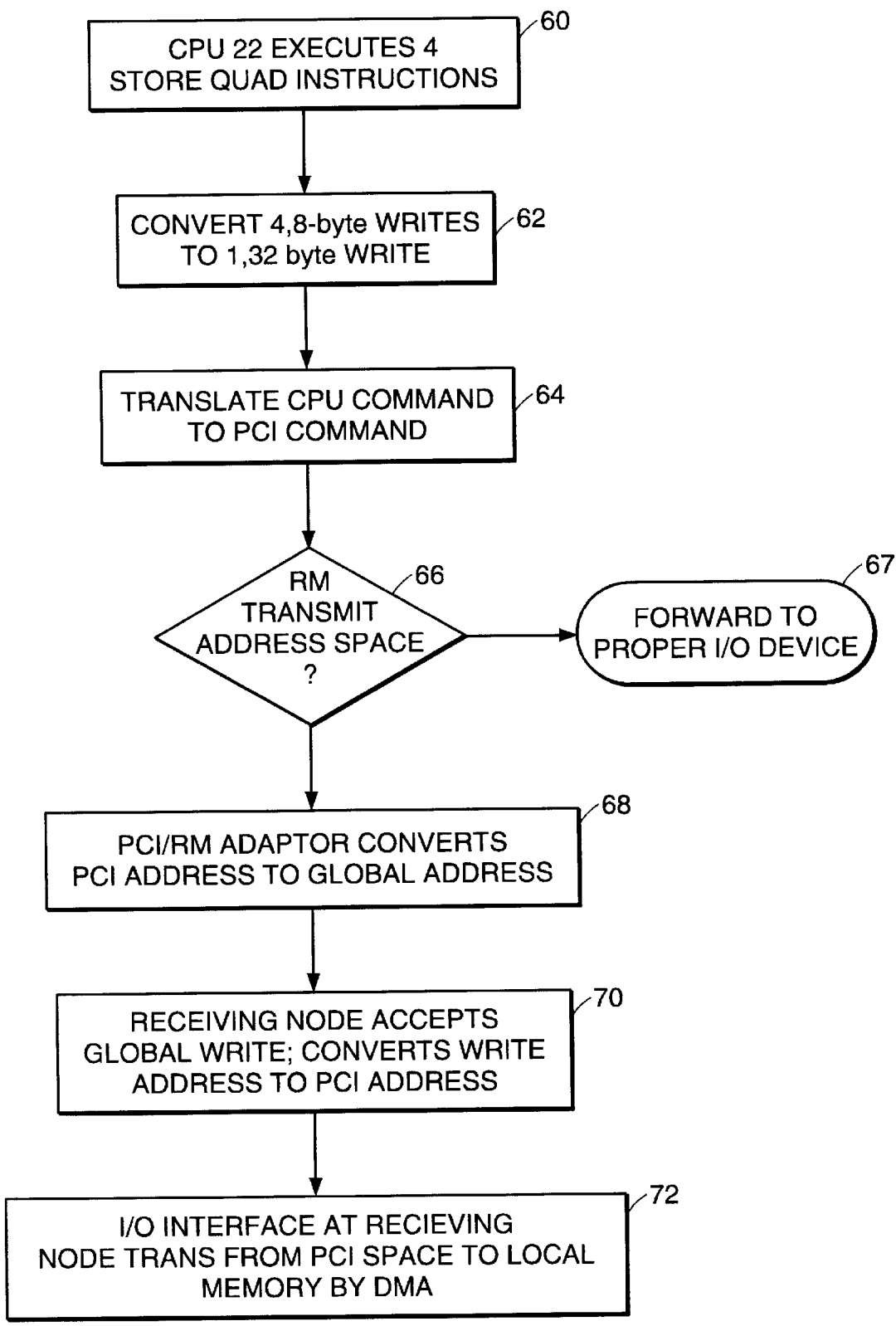
FIG. 5 is a flow diagram illustrating a write update between nodes in the cluster system of FIG. 1.

For example, referring now to FIG. 5, an example write of 32B across the data link 20 from Node 1 to node 2 is shown to include the following steps. First, at step 60, the CPU 22 performs a sequence of 4 Store Quad instructions to an aligned 32 byte address in PCI address space, where each Store Quad instruction has the effect of storing 8 bytes of information. At step 62, the 4, 8 byte stores are converted by the CPU 22 into one aligned 32 byte store command. At step 64, the I/O interface 28 translates the 32 byte store command into a 32-byte PCI write to the corresponding MC address portion of PCI memory space. At step 66, the PC to MC adapter 34 checks the address of the write command to see if it is to MC address space. If it is, at step 68 the PCI to MC adapter 34 accepts the write, converts it into a 32 byte MC write to the corresponding network address and transmits the request over the data link 20. To convert a PCI address to an MC address, bits <31:27> of the original address are replaced with the contents of the MC base address register 53. The address is then extended to a full 40 bits by assigning zeros to bits <39:32>. At step 70, the PCI-MC adapter at the receiving node accepts the MC write and converts it to a 32 byte PCI write to the corresponding MC page. At step 72, the I/O interface at the receiving node accepts the write and converts it to a 32 byte write to local memory space with an address defined by a corresponding DMA scatter/gather map 57 (FIG. 4).

Figure 6A:
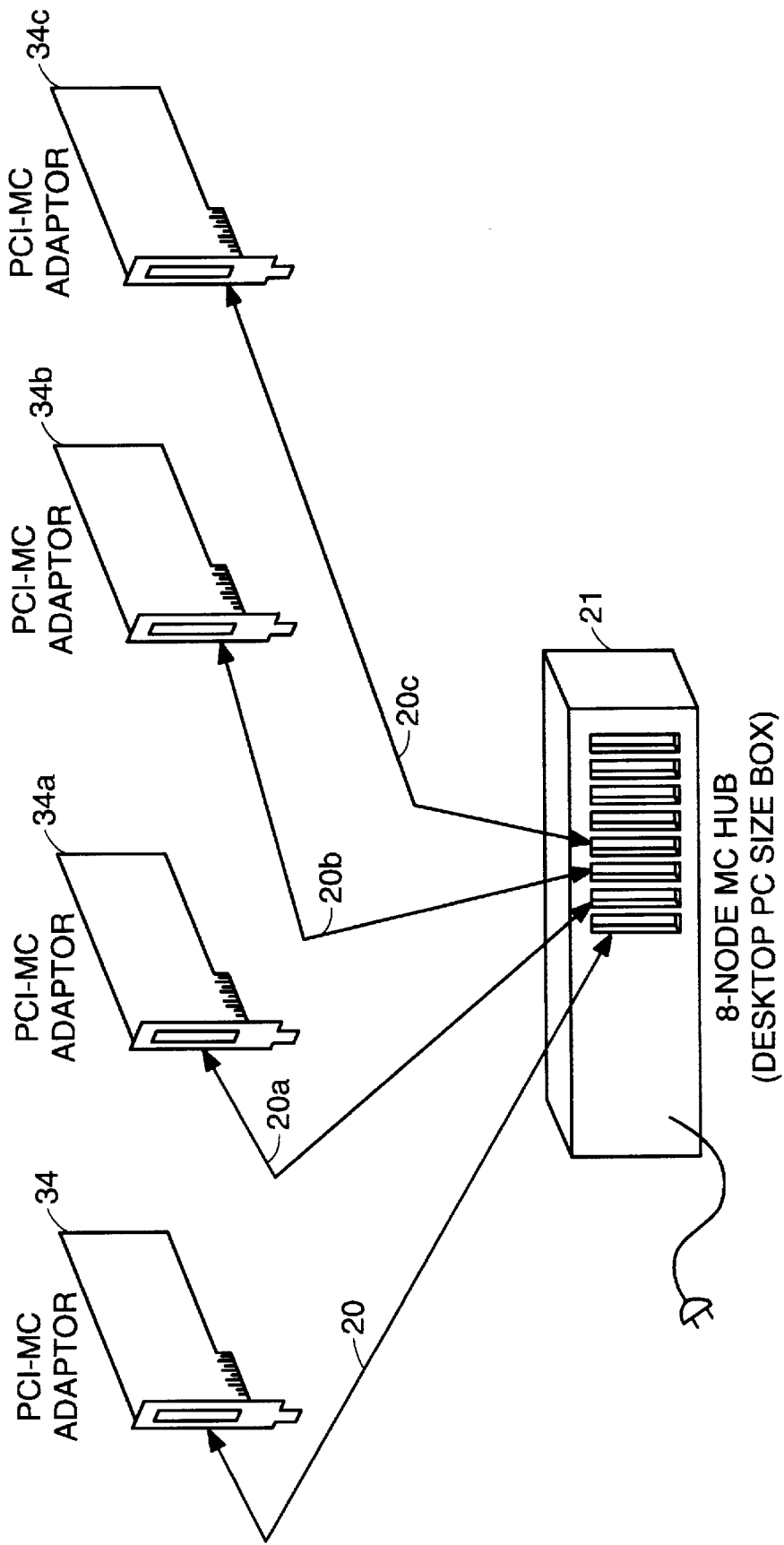
FIG. 6A is a diagram illustrating a hub allowing for the connection of each of the nodes of FIG. 1 to provide a network.

Referring briefly to FIG. 6A, the connectivity of the PCI to MC adapters 34, 34a, 34b and 34c of each of the nodes to the MC Hub 21 is shown. The MC Hub 21 serves merely to provide connectivity between the adaptors, and in this embodiment performs no logical functionality other than performing a horizontal parity check of data on the data links 20, 20a, 20b, and 20c. In order to include additional nodes into the network, the PCI to MC adapter of each node to be added to the system is coupled to one of the eight slots of the PCI to MC Hub via a data link cable, as indicated by the arrows in FIG. 6A.

Figure 6B:
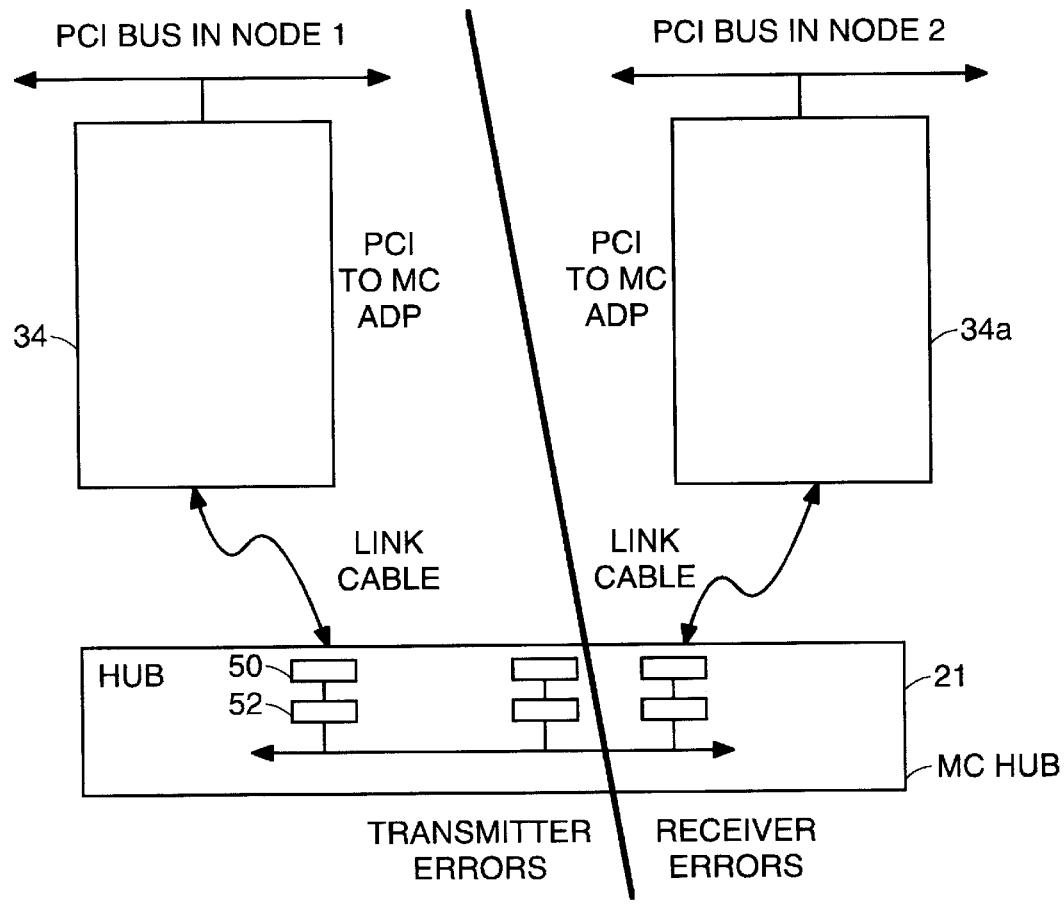
FIG. 6B is a diagram illustrating the division of transmit path errors and receive path errors between nodes communicating in the network configuration of FIG. 6A.

Referring briefly to FIG. 6B, the internals of the MC Hub 21 are shown. The Hub 21 includes a number of state devices 50, 52 coupling a link cable 20 to a network bus 55. Providing state devices in the Hub facilitates the computation of parity on data as it is transmitted onto the bus. In addition, data parity may also be computed as data is received at each node. By providing parity checking at both the transmit and receive portions of the network bus 55, errors are more easily isolated to the appropriate nodes or network interface. By effectively isolating the errors, the appropriate nodes may be removed from the network as required. Error correction and isolation will be discussed in further detail later in the specification.

Referring now to FIG. 7A, a second embodiment of the Reflective Memory design is shown. Here, although only two nodes 75 and 85 are shown coupled via data link 84, it is to be understood that more nodes could be coupled to the data link to form a larger cluster. The arrangement of having only two nodes in the network removes the requirement of having an actual Hub device. Here the system is drawn with only a 'virtual' hub. All the functionality of the Hub (i.e. the error isolation) is performed in the link interface portions of the MC adaptors.

Node 75 includes a CPU 76 and a memory 77 coupled via a local system bus 78. Also coupled to the local system bus 78 is a Memory Channel™ (MC) adaptor 80. An I/O interface 79 is additionally coupled to bus 78 to provide interfaces between devices on external bus 81 such as disk device 82 and the rest of the processing system in node 75. Node 85 is shown configured similarly to Node 75, and will not be described in detail.

MC adaptor 80 includes a transmit path and a receive path, both of which are substantially similar to the receive and transmit paths described with reference to FIG. 4, yet without the PCI interface elements. Thus the MC adaptor includes a Transmit Page control table 102, a Transmit Fifo, 103, a transmit Link Interface 104, a receive link interface 105, a receive fifo 106, a Receive page control table 107, and a MC address base register 108. Because the MC adaptors 80 and 90 are coupled directly to the system bus 78, a map 110 is provided to map network addresses to physical addresses of memory 77 when data is received over data link 84.

Figure 7B:
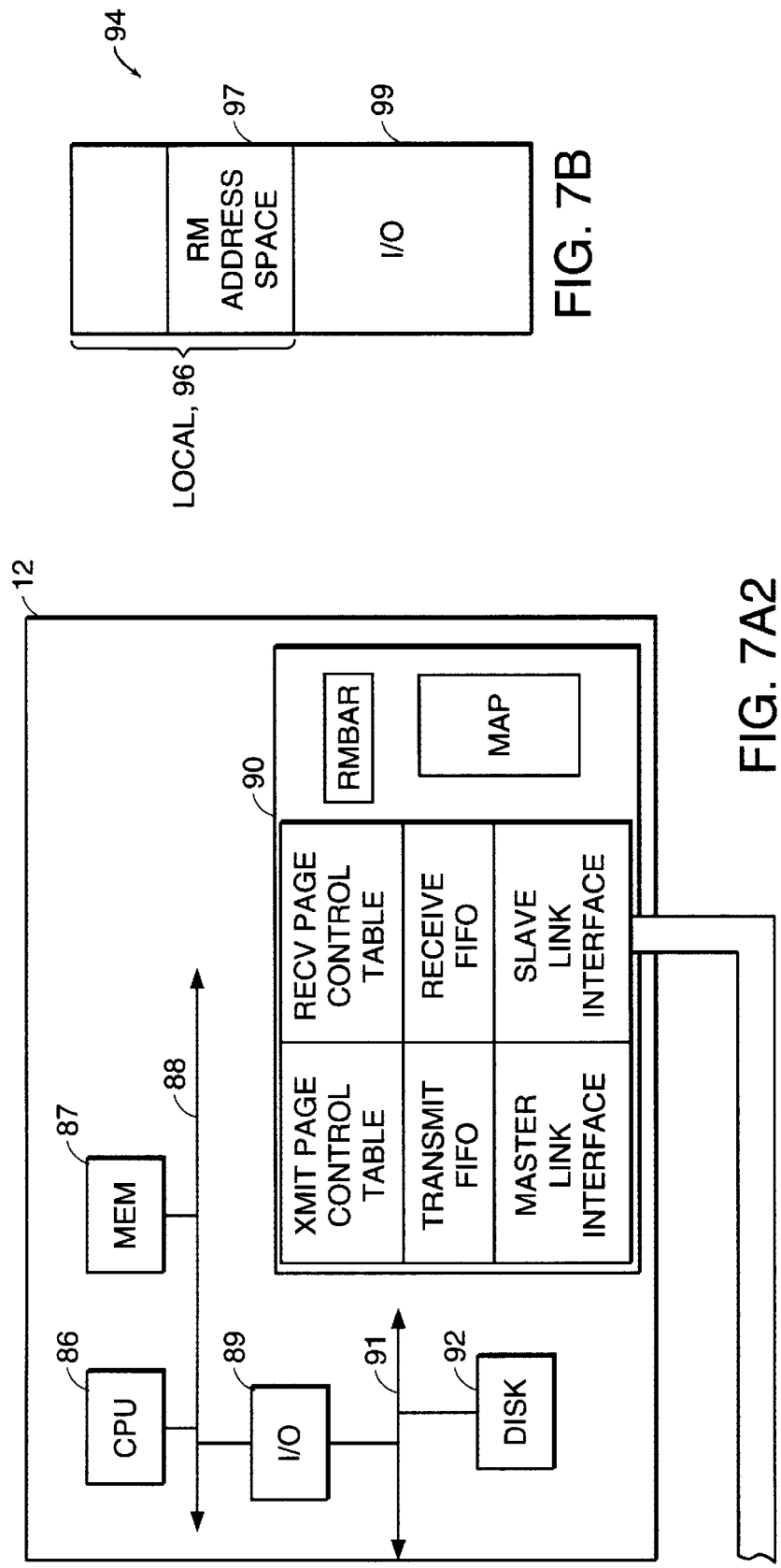
FIG. 7B is a block diagram illustrating the memory address space allocation of the cluster system of FIG. 7A.

Referring now to FIG. 7B, the allocation of memory space for a MC network such as that in FIG. 7 comprises 2 address spaces, including a local address space 96 and an I/O address space 99. The local address space 96 includes MC address space 97.

Referring again briefly to FIG. 5, a reflected write between nodes in the network of FIG. 7A progresses through most of the steps of FIG. 5, with the following exceptions. After step 62, when the write is transformed to a 32 byte write, it is transmitted over local bus 78. There is no conversion done by the I/O unit on the CPU write address, so step 64 is not performed. Rather, at step 66 the MC adaptor 80 compares the write seen over the local bus 78 to see if the address falls within the range of the MC address space. If it doesn't, there is no action on the behalf of the MC adaptor. If the address does fall within the MC address space, at step 68, the Transmit control table 102 is indexed and the corresponding network address is provided into the transmit fifo 103 for eventual propagation onto data link 84. The node receiving the write command performs the same step as that of step 70, however, it converts the network address to the local write address. A Direct Memory Access (DMA) operation is then performed at step 72 from the MC adaptor into local memory or the I/O device (rather than from the I/O interface, as described with reference to FIG. 1).

Thus it can be seen that in contrast to the embodiment described with reference to FIG. 1, the embodiment shown in FIG. 7A allows for network writes to be triggered off of the local system bus 78. Such an arrangement provides improved performance over the embodiment of FIG. 1, because communication between nodes is allowed without the added overhead and delay associated with the transferring commands through the PCI interface. The embodiment of FIG. 7A, however, does not provide the flexibility in design as that shown in FIG. 1 for two reasons. First, because the MC adaptor is coupled directly to the system bus it cannot be easily added or removed as a system component. Second, because each newly designed multi-processor system tends to have a different system bus protocol, the design configuration described with reference to FIG. 7A would mandate that existing MC adaptors be updated to accommodate the new system bus protocol. With the design configuration of FIG. 1, an MC adaptor may be coupled to any PCI bus. Thus it can be seen that each embodiment has advantages depending on the type of configuration desired by the designer.

By providing a network address space that is common to all of the nodes in a cluster, a mechanism is provided that allows for sharing of data and communication between processes on different nodes without the complexity of the local area network protocol. Rather, during operation the protocol is virtually invisible to the nodes in the network because the writes to network address space appear as simple writes to memory. Because elaborate protocols are not required for communication, some mechanism is required to ensure that transmissions between nodes are made correctly and that data shared by the nodes in the network remains coherent. The coherency mechanisms of the present invention include a method of data link synchronization, full node synchronization, and error detection, each of which will be described in detail below.

Data Link Synchronization

Referring now to Table 1, an entry from the Transmit page control table 102 and the receive page control table 107 of FIG. 7A are shown to comprise a total of 16 bits of control information. There is a page control table entry comprising transmit control bits and receive control bits for each page of MC address space.

TABLE I

| TRANSMIT CONTROL PAGE TABLE BITS | |
|---|---|
| 15 | Reserved |
| 14:9 | Destination Node ID<5:0> |
| 8 | Broadcast |
| 7 | MC-Transmit Enable (TEN) |
| 6 | Loopback |
| 5 | Generate ACK Request |
| 4 | Suppress Transmit After Error (TRAE) |
| Receive Control Page Table Bits | |
| 3 | MC-Receive Enable (REN) |
| 2 | Interrupt After Write |
| 1 | Suppress Receive After Error (SRAE) |
| | Both |
| 0 | Parity |

The transmit control bits comprise bits 15:4 of the page control bits, and include a Destination Node ID field, a Broadcast field, a MC-Transmit Enable field, a Loopback field, a Generate Acknowledge (ACK) field, and a Suppress Transmit After Error (SRAE) field. The transmit control page table bits operate in general as follows, where the terminology 'set' is meant to indicate the active state of field, which will result in the described result. The Destination Node ID field indicates which node in the network is to receive the data that is written to the corresponding page of MC address space. When the Broadcast field is set, every write to the corresponding page of MC address space is sent to all nodes in the network. When the Loopback field is set, every write to the corresponding page of MC address space will result in a return write to the node that initially issued the write command. When the generate ACK field is set, when any write made to the corresponding page of MC address space, that is issued to another node on the network, requires the recipient node to return an acknowledgement that it has received the data from the sending node. When the Suppress Transmit After Error (STAE) bit is set, any write to the corresponding page of MC address space from a node that has detected an error at some point during the transmission of the data to another node in the network, will stop transmission once it has detected the error.

The general functionality of the receive page control bits are as follows. When the MC-Receive Enable (REN) field is set, any writes received by a node from the network to that page of the MC address space may be accepted into the receive fifo of the node provided it is a write destined for that particular node. When the REN field is not set, then W writes to the node are not accepted. When the Interrupt After Write bit is set, the MC adaptor of the receiving node, after receiving the write data, will cause an interrupt signal to be set to interrupt the processing of the CPU at the node. When the Suppress Receive After Error (SRAE) bit is set, if an error occurs during the receipt of a write to the page from the cluster, the MC adaptor at the receiving node will stop accepting data to page for which this bit is set.

The MC Data Link Interface

While up to this point, interfacing with other nodes in the network has been referred to generally as 'writes to the data link', it should be understood that there is a protocol associated with communicating over the MC data link 84. Each node communicates with other nodes in the system by issuing a 'packet' of data over MC data link 84. The general arrangement of an MC packet is shown in FIG. 8.

Referring now to FIG. 8, the data link 84 comprises 39 bits of information comprising Link AD<31:0>, a byte mask/command field <3:0>, a parity bit, and a two bit cycle control field DV. It should be understood that the number of bits shown for each field is simply one example of an implementation. Modifications may be made as required by the characteristics of the design.

During each cycle of an MC transaction, the 39 bits are driven onto data link 84. According to the MC protocol, each MC transaction is separated by at least one idle cycle, such as idle cycle C0, to accommodate the switching constraints of data link 84. The idle cycle and vertical parity calculation cycle are each characterized by the DV bits being set to a 01.

During Cycle C1, the MC header is driven onto data link 84. The MC header includes various information received from the page control table entry, such as the broadcast bit, the loopback bit, the Ack Request bit, and the Destination Node ID field. In addition, the upper bits of the network address are transmitted during the header cycle. Note that the DV bits during this cycle are set to a 10 to indicate that there is valid data on the data link during the cycle. During cycle C2, the remaining bits of the global address are transmitted onto the data link, and the DV bits again indicate valid data. During cycle C3, 32 bits of data and 4 bits of byte mask are transmitted onto the data link. Depending on the size of the write, the node can continue to send 32 bits of data for the next N cycles, until at cycle N, the node transmits the last 32 bits of data and 4 bits of byte mask. During cycle $C_{N+1}$, 36 bits of parity for the write data are transmitted on data link 84. During this cycle, the DV bits transition from valid data to the invalid state. Each node recognizes the transition as indicating that the data link cycle includes vertical parity bits and is the final data link cycle. The following data link cycle is idle.

Each node arbitrates for access to the data link for packet transmission. An arbitration protocol is implemented to ensure that each node in the network 'sees' the writes to the data link in the same order. In essence, the data link can therefore be thought of as a 'pipeline' of data packets. The arbitration protocol described below guarantees that once a packet has been placed on the data link, or in other words 'put in the pipeline', it will be received at the destination node. As a result, the data link, or broadcast circuit, itself is thought of as the 'coherency' point of the design.

It is noted here that the guarantee provided by the Memory Channel™ system that a packet will be received at each node differentiates it from the typical Local Area Network. As discussed previously, in a Local Area Network, once a node issues a packet, there is no guarantee that this packet will reach its destination, and no requirement that every node in the network 'sees' the packet. By ensuring that every node sees all writes in order, the hardware guarantees that no communication error goes undetected by the network. Accordingly, the present invention moves the responsibility for maintaining high network availability from the typical software implementation of LAN systems into hardware.

Figure 9:
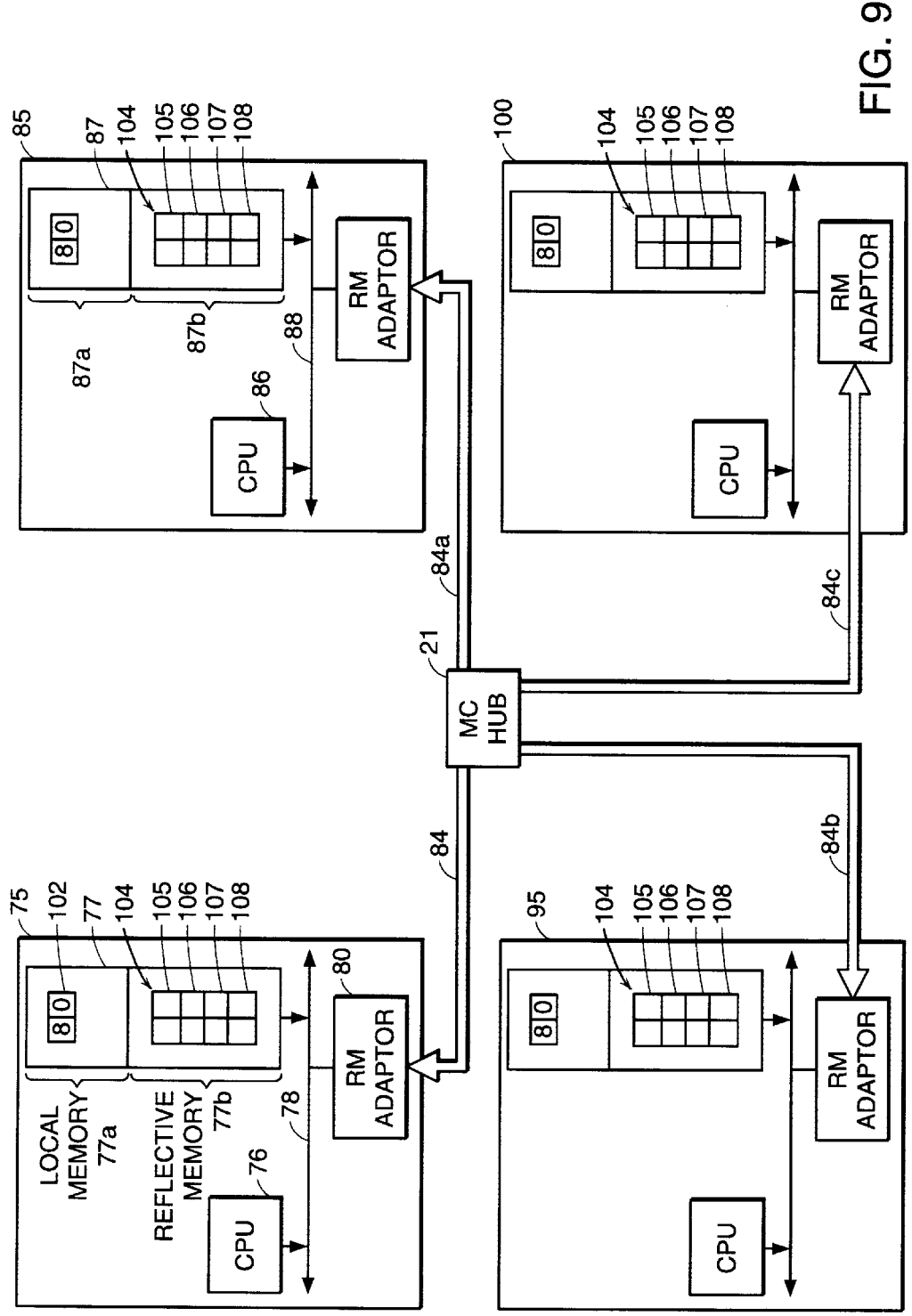
FIG. 9 is a block diagram illustrating a data structure for use in synchronizing transactions between nodes in the system of FIG. 4 or the system of FIG. 7A.

Referring now to FIG. 9, the multi-processor system of FIG. 7A has been expanded to include 4 nodes 75, 85, 95, and 100 coupled via data links 84, 84a, 84b, and 84c, respectively, to Hub 21. In FIG. 9, only the CPU, memory, and MC adaptor components of each node are shown, although it is understood that other elements such as an I/O interface node may also be coupled to the system bus.

The memory of each node is shown apportioned into two discrete addressable portions. For example, memory 77 of node 75 is shown apportioned into a local memory portion 77a, and a reflective memory portion, 77b. The local memory is shown to include local state structure 102. The reflective memory portion is shown to include synchronization structure 104.

It should be noted that although only one shared synchronization structure 104 is shown, software maintains a separate synchronization structure for each particular item that it needs to synchronize with multiple nodes in the system. For example, a shared data structure may be an item that is assigned a synchronization structure. Updates to the data structure are performed after first gaining control of the synchronization structure as described below.

Although the synchronization structure is shown stored in memory, in the preferred embodiment the maintenance and control of the synchronization structure is accomplished through software. The hardware provides certain basic structural elements that ensure adequate software control of the structure, such as guaranteeing that order on the data link is preserved, providing loop-back capability, and terminating transmission to facilitate quick handling of errors.

Data coherency of the shared synchronization structure is maintained because commands on data link 84 are viewed in the same order by every node in the network. Accordingly, requests for access to the synchronization structure also appear in order at each node.

The synchronization structure 104 includes a longword of data for each node in the network, and is used to represent the communication 'state' of the node. Longword 105 is the state for node 75. Longword 106 is the state for node 85. Longword 107 is the state for node 95, and longword 108 is the state for node 100. Because the synchronization structure is shared by all nodes, the longwords representing the state of each node are shown as physically residing in all of the nodes.

The 'state' stored as each longword represents the communication status of the corresponding node. For example, one state indicates that the node is transmitting data related to the synchronization structure 104. Another state indicates that the node has data to write to the data structure associated with the synchronization structure, but has not yet been granted access to the structure.

Each longword in the synchronization structure 104 comprises at least 2 fields, a 'bid bit' and an 'own bit'. The bid bit is set by a node when bidding for use of the resource that the synchronization structure is protecting, i.e., the node has data that it wants to pass to another node or nodes in the network. The own bit is set to indicate that the node 'owns' the resource, i.e., the node is in the process of changing or using the resource. If the resource is a shared data structure then this would include writes to that structure.

Figure 10:
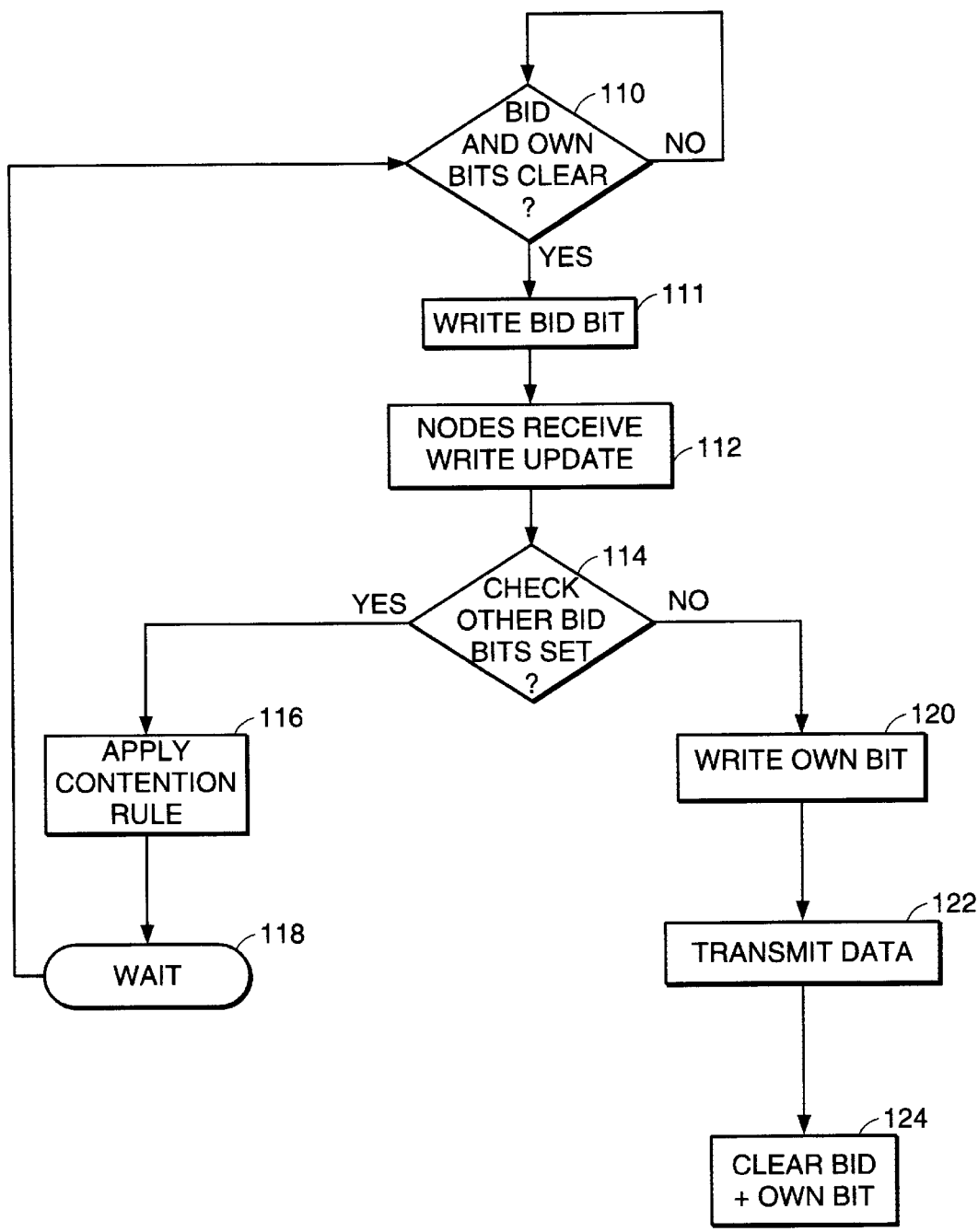
FIG. 10 is a flow diagram to illustrating a process to be followed by software to maintain synchronization between multiple writers to a shared structure such as that shown in FIG. 9.

The local state structure 102 also includes a bid bit and an own bit, and is used by each node to keep track of their communication state as follows. Referring now to FIG. 10, a flow chart illustrating a synchronization method for maintaining coherency of data structure 104 will be discussed with reference to the block diagram elements of FIG. 9.

For the purpose of this example, assume that CPU 76 of node 75 has data to write into a data structure protected by synchronization structure 104. At step 110, the CPU reads the bid bits and own bits of the other nodes in the synchronization structure 104, to make sure that another node has not requested the synchronization structure or is currently using the data structure. If all the bid bits and own bits are 'clear', i.e. indicating that no nodes are currently in the process of accessing the data structure, at step 111 the node 75 executes a write to reflective memory space in its local memory to set the bid bit in the longword 105 of the synchronization structure. As discussed with reference to FIGS. 1 and 5, the reflective write is sent from CPU 76 onto system bus 78, through the MC adaptor 80 onto data link 84. The 'loopback' bit in the header portion of the MC packet (FIG. 8) is asserted, to instigate a loopback of the write to the sending node.

At step 112, the write data is received into the receive FIFO's of each of the MC adaptors of each of the nodes. Consequently, the write is looped back into the receive FIFO of node 75. The write propagates and updates the synchronization structure in local memory. At step 114, the synchronization structure is examined to determine when the bid bit is set.

In the event that another nodes' bid bit is set during the loopback transaction, a contention process, known to those of skill in the art, may be used to determine which node gains priority over the structure. For example, the originally bidding node may backoff for a predetermined time period, and then re-attempt setting the bit. It should be noted that other backoff techniques may also be implemented by one of skill in the art. Because the method according to this invention is primarily useful for granting access to a structure when there is light contention for the structure, the procedure required when there is a conflict need not be described in detail.

If, at step 114, it is determined that no other bid bits were set during the loopback time period, at step 120 CPU 76 initiates a write to set the 'own' bit in longword 105. Once the CPU initiates the setting of the own bit, node 75 owns the shared data structure, and at step 122 is free to transmit changes of that data structure to other nodes in the network. For ease of implementation, in this design the instruction sequence of setting the bid bit to setting the own bit is non-interruptible. However, it should be understood that such a limitation is not a requirement of this invention.

At step 124, when the CPU 76 has finished data transmission, it issues a reflective write to clear the bid and own bits in the synchronization structure 104. As a result, other nodes are able to gain access to the shared data structure.

The above described synchronization protocol is illustrative of a successful strategy that could be used by software to control access to a shared data structure. Once a change to a data structure is initiated, the node can be certain the change will be completed without interruption because the transmitting node has gained exclusive ownership of the data structure for that transmission period. Thus the data link provides a synchronization point for data. This synchronization mechanism is particularly useful for allowing the operating system to provide access to shared resources, whether the resource is an entire database or simply a quadword of data.

Through the use of a loopback method for acquiring control of the synchronization structure, a high performance synchronization mechanism has been described which allows coherency of a data structure between multiple nodes in a cluster to be maintained.

Certain systems require reliable delivery of the data from one node to another. Typically this is done with software algorithms that perform redundancy checks on the data and acknowledgements between nodes. One aspect of the present invention involves the use of a 'hardware only' mechanism that allows for reliable delivery of data. By providing reliable delivery via hardware, system performance is greatly improved by the removal of the inherent overhead of software support of error handling. The mechanism for ensuring reliable data delivery makes use of the ACK field in the header portion of the MC packet to provide an MC ACK transaction as described below.

The MC ACK transaction provides a low-level hardware-based acknowledgement that an MC write transaction, or a sequence of MC Writes, has been successfully delivered to the destination nodes. The MC ACKS, in combination with the guaranteed ordering characteristics of MC Writes described above, are used by communication protocols to implement recoverable message delivery.

Referring now to Table II below, an MC ACK transaction is initiated when a node issues a write to a MC page that has the Generate ACK Response bit (see Table I, bit 5) in the Page Control table entry set. Note that an ACK transaction is not initiated for other writes which might have had an error when those writes are to a page having the SRAE bit is set.

When the MC adaptor issues the MC Write on data link 84, the ACK field in the header portion of the write packet is asserted (See FIG. 7, bit <26>of the MC header C1). Any node that has the Receive Enable bit REN (See Table 1, above) set for the page of MC address space returns an MC ACK response. The format of the MC ACK response is shown below in Table II.

TABLE II

| Valid B7 | unused B6 | unused B5 | unused B4 | unused B3 | unused B2 | TPE B1 | RPE B0 |
| --- | --- | --- | --- | --- | --- | --- | --- |
| 1 | 0 | 0 | 0 | 0 | 0 | 0/1 | 0/1 |

The MC ACK Response is a returned byte of data which contains MC error summary information. The Valid bit is used to indicate that the responding node received the packet of data. The TPE bit is used to indicate whether there was a Transmit Path Error, that is an error on the transmit portion of a previous MC transaction. The RPE bit is used to indicate whether there was a Receive Path error, i.e. an error on the receive portion of a previous MC transaction. The errors include both parity errors and other types of transmission/receipt errors, and will be described later herein.

Figure 11:
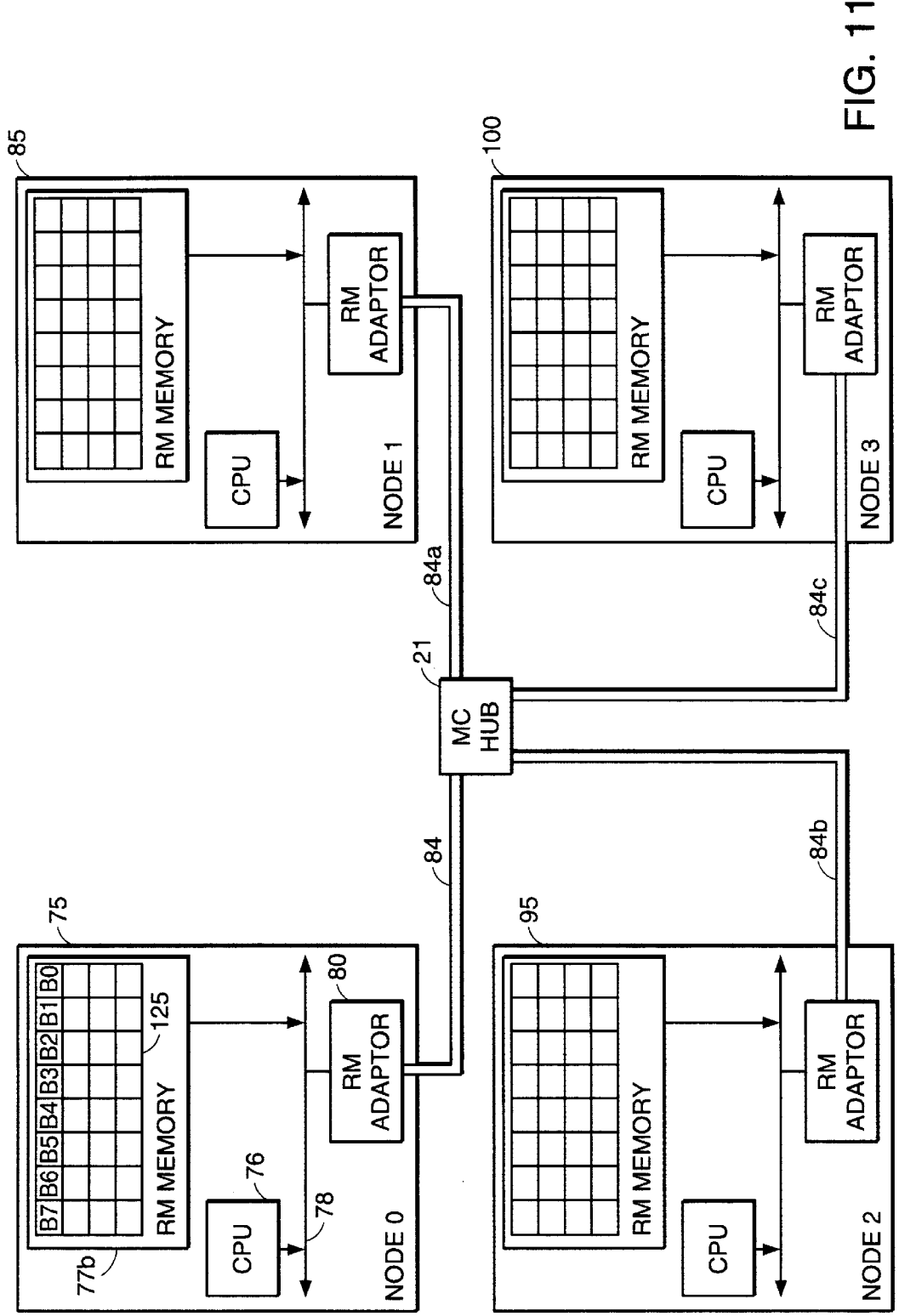
FIG. 11 is a block diagram illustrating a data structure required for an acknowledgement protocol for use in the system of FIG. 4 or the system of FIG. 7A.

Referring now to FIG. 11, for each MC Write transaction that includes an MC ACK request, an ACK data structure 125 is provided in the Reflective memory portion 77b of memory. Note that in FIG. 11, only the MC portion of memory is shown. The ACK data structure contains N bytes of data, where N is equal to the number of nodes that are to receive the transmitted MC Write data. In FIG. 11, the ACK data structure is shown to include 4 bytes of data. Each byte of data in the ACK data structure 125 comprises 8 bits of data B0–B7 allocated as shown in Table II above.

When the node 75 sends out an MC Write transaction with the ACK field set, the destination nodes (as determined by the DEST field of the MC header) receive the MC transaction into their input buffers. For this example, assume that the type of MC Write initiated by node 75 is a Broadcast Request, meaning that every node on data link 84 is to receive the data. To send a Broadcast request, the Broadcast bit of the MC header is asserted during the MC write Transaction. Because it is a Broadcast Request, and because there are 4 nodes in the cluster, the data structure 125 is allocated to receive 4 bytes of ACK Response.

As each node in the cluster receives the MC ACK request, it returns a byte containing MC error summary information and a valid bit. The byte is returned to the byte address derived by aligning the ACK Request address to a 64B boundary, and adding the MC Node ID of the responder to the modified ACK Request Address. For example, assuming that the MC ACK Request Address was 28000000, node 75 with ID 0 would write the MC Response byte to address 28000000, node 85 with ID number of 1 would write the MC Response byte to address 28000001, node 95 with ID number 2 would write the MC Response byte to address 28000002, and node 100 with ID number 3 would write the MC Response byte to address 28000003. Once all of the MC ACK responses are received by the transmitting node, the node is assured that the entire message has been delivered to the receivers memory.

It should be noted that successive MC ACK transactions may be initiated from different nodes in successive stages of the MC 'pipeline'. As a result, a form of multi-threading of processes can be supported.

The ACK structure allows for full synchronization of data between nodes in the cluster. Full synchronization is achieved because the node that is sending out the MC Write data may monitor the ACK data structure to see when all of the Valid bits in the data structure are set. Once all of the Valid bits are set, the process executing on the node is guaranteed that all of the nodes have received the most up-to-date copy of the data.

However, two situations may occur to defeat synchronization. First, the transmitting node may not receive an ACK response when expected. Second, the transmitting node may receive an ACK response, however, either the TPE or RPE bit is set, thereby indicating an error on either the transmit or receive path, respectively.

The page table bits SRAE (Suppress Receive After Error) and STAE (Suppress Transmit After Error) operate in conjunction with the TPE and RPE bits of the ACK response to provide an error detection and recovery mechanism as follows.

The TPE bit is set for errors that occur during the transmission of a packet from one node to another in the network. These types of errors include but are not limited to: Control Page Table Parity Error on Transmit, Data link Request Timeout, Transmit FIFO Framing Error, MC Transmit Parity Error, Tenure Timeout, and Heartbeat Timeout. Each error is logged upon detection in an error register (not shown) in the MC adaptor. If, after transmission, the error register indicates the existence of an error, when the responding node loops back to update the ACK data structure, it sets the TPE bit of its entry in the data structure.

The effect of setting the TPE bit of the data structure is felt in the next subsequent MC WRITE transaction by that node. (Note that the generation of ACK responses by the node for writes by other nodes is not affected by the TPE bit being set at the node). Once the TPE bit is asserted, all subsequent MC transmit writes from the node with the TPE bit asserted are treated by the MC adaptor of the node as follows. MC Writes reflected to pages with the STAE bit=0 (where 0 here indicates the unasserted state) result in a normal MC Write transaction. MC Writes reflected to pages with the Control Page Table STAE bit=1 (where 1 here indicates an asserted state) are not performed. Writes to pages with STAE=1 bit of the Control page table set and the LOOPBACK bit in the MC header do not result in a loopback operation.

The RPE bit is set for errors that occur during the receipt of the packet by a node. These types of errors include but are not limited to: Suppress Timeout, Buffer Overflow, MC Receive Command/Address Parity Error, MC Receive Data Parity Error, MC Receive Vertical Parity Error, MC Receive Framing Error, and Control Page Table Parity Error on Receive. Each error is logged upon detection in an error register (not shown) in the receive portion of the MC adaptor.

When the RPE bit is set as a result of an error during receipt of a packet, the node receiving the packet does not return the ACK Response to the transmitting node as expected. Rather, the receiving node updates the ACK byte data in its copy of the shared ACK structure with the RPE bit set. The MC Write data and all subsequent MC Writes are accepted the MC adapter and treated as follows.

Writes to blocks of data where the Control Page Table SRAE bit=0 result in normal transactions, whether it is a simple WRITE command or an ACK command. Writes to blocks of data with the Control Page Table SRAE bit=1 do not result in any operation, but are dropped. Writes to blocks of data with the Control Page Table SRAE bit=1 and where the MC header portion of the received MC Write packet has the ACK bit=1 do not result in the generation of any ACK responses. In effect, because the write is dropped, no side effects of the write are performed. Similarly, writes to blocks of data with the Control Page Table SRAE=1 and INTR=1 do not result in an interrupt.

While the above scenario was described from the vantage point of a transmitting node sending out an ACK Request that was faulty, it should also be understood that the mechanism is just as effective for MC Writes which are not ACK Requests. When an error occurs, whether it is on the receiving or transmitting end of the packet, the node experiencing the error basically precludes itself from further operation. When the node does not respond to ACK Requests, other nodes in the system are alerted that there are errors at that node, and steps are taken to remove the node from the cluster and correct the error.

Thus the SRAE bit and STAE bit provide a simple and straight forward mechanism for precluding message transmission from a defective node. In addition, by halting data transmission from a faulty node, faulty data is not propagated to other nodes in the system.

The above discussion has proceeded with the understanding that any writes to an address in network memory are reflected to other nodes on the data link. However, there are some processes which require iterative writes to a block of memory in order to accomplish their function. One example of such a process is the solving of a system of simultaneous equations configured in a matrix form. To solve a matrix (for example a parallel implementation using Gaussian Elimination), a repetitive set of operations is performed on the matrix, which includes the steps of manipulating the rows of the matrix to produce a diagonal of ones, and then generating columns of zeros 'under' each previously generated diagonal term.

When solving a matrix in parallel form, each node holds a portion of the matrix. It is only during the operation to calculate the coefficients that create zeros under the diagonal term that the writes to that nodes' portion of the matrix are needed by any other node in the cluster. During all the reduction operations, the working results are not required by the other nodes. However, in a shared memory architecture such as the Memory Channel™ architecture, each intermediate step in the matrix analysis is broadcast over the system bus 84. As a result, the data link bandwidth is decreased as performance is degraded by the transmission of intermediate results to other nodes in the cluster.

According to the present invention, the addition of a Reflective Store Instruction alleviates performance problems in compute intensive applications by eliminating the broadcast of intermediate results over the network data link. By using the Reflective Store instruction, the MC architecture, described above, may be modified such that in order to have a write to reflective memory space reflected over the network data link, the Reflective Store Instruction must be issued. As a result, writes to shared memory do not occur 'automatically'.

The Reflective Store Instruction is advantageously an instruction available in the instruction set of the CPU. Alternatively, a state bit may be set in the MC adaptor which controls whether writes will be automatically reflected or not. By providing a mechanism to control the transmission of the write data over the network, software can be crafted to control the reflective nature of the operations, and as thereby increase the overall system performance.

A memory-mapped architecture has been described that allows for improved performance in a network ed system. Because each node in the network receives data from the data link in the same order, a bid protocol is used to synchronize data transactions between nodes, thereby ensuring data coherency without the typical overhead associated with other network protocols. In addition, a straight forward acknowledgement protocol permits a transmitting node to be notified of message receipt without interrupting the performance of the node as is typically done with known network protocols. An error strategy provides security in network transmissions by isolating the faulty node without interrupting the overall network operation. When the error strategy is used in conjunction with the acknowledgement protocol, a faulty node in the network may be readily identified and removed from the system without impeding the processes executing on other nodes in the network. Network performance may be further enhanced through the use of a Reflective Store Instruction mechanism which allows for update of the memory mapped network portion of memory only when necessary to maintain coherency between processes operating on other nodes in the network.

Having described a preferred embodiment of the invention, it will now become apparent to one of skill in the art that other embodiments incorporating its concepts may be used. It is felt, therefore, that this invention should not be limited to the disclosed embodiment, but rather should be limited only by the spirit and scope of the appended claims.

What we claim is:

1. A method for providing a shared memory in a multiprocessor system comprising a plurality of nodes coupled by a data link, the method comprising the steps of:

allocating a portion of memory at each of said plurality of nodes to provide a shared memory for storing a plurality of shared data items, wherein a subset of said shared data items of said shared memory are writable by a subset of said plurality of nodes; and for each shared data item in said subset of data items of the shared memory, maintaining, in said shared memory of each of said plurality of nodes, a multinodal data strueture, said multinodal data structure having data item access information of each node of a subset of said plurality of nodes sharing said data item, the multinodal data stricture being shared by each node in the multiprocessor system such that access of shared data items by multiple nodes is enabled while ensuring recoverable communication in the multiprocessor system.

2. The method of claim 1, wherein said data structure comprises a number of entries corresponding to a number of said subset of nodes sharing said data item, and wherein said method further comprises the step of permitting one of said subset of nodes to access said at least one data item responsive to said data item access information of each of said subset of nodes, wherein each entry of said data structure includes a request bit for indicating that said corresponding node has provided a request to access said data item.

3. The method according to claim 2, wherein each of request for a data items are received in order by each of said plurality of nodes.

4. The method of claim 1, wherein said data structure comprises a number of entries corresponding to a number of said subset of nodes sharing said data item, and where each of said entries in said data structure comprises at least two bits of data, the first bit of said at least two bits of data indicating whether said corresponding node requires access to said data item, the second bit of said at least two bits indicating whether said corresponding node has current access to said data item, and wherein said method further comprises the steps of:

reading, at each node having a pending access command for said data item, said data structure corresponding to said data item to determine if another node of said plurality is currently accessing said data item or requesting said data item; and issuing, responsive to a determination that no other node of said plurality is accessing the data item or requesting the data item, a request for access to said data item by writing said first bit of said entry in said data structure corresponding to said issuing node.

5. The method of claim 4, wherein each of said requests for access to said data item are received in order by each of said plurality of nodes.

6. The method of claim 5, further comprising the step of:

reading, after said first bit of said entry has been set, said data structure to determine if another node of said plurality is currently accessing said data item or is requesting said data item; and writing, responsive to a determination that no other node is currently accessing said data item or is requesting said data item, said second bit of said entry in said data structure corresponding to said issuing node.

7. The method of claim 5, further comprising the step of:

receiving, at each node, said request for said shared data structure; and updating, at each node, in response to said received issued request, said respective data structure.

8. A multiprocessor computer system complising:

a plurality of nodes coupled by a data link, each node comprising a memory, each memory of each node comprising (a) a local memory accessible by said corresponding node and (b) a shared memory accessible by each of said plurality of nodes;

means, coupled to said shared memory, for storing a plurality of data items in said shared memory, each data item of said plurality to be shared for reading and writing by a subset of said plurality of nodes; and means for providing access to said each of said plurality of data items by said corresponding subset of nodes, said means for providing access including, for each data item, a multinodal synchronization structure stored in said shared memory and having data item access information of each node in the subset such that access of said data items by multiple nodes is enabled while ensuring recoverable communication.

9. The apparatus of claim 8, where each of said subset of nodes requiring access to said data item further comprises:

means for issuing commands on said data link for updating said synchronization structure; and means for queuing said commands on said data link to allow each of said plurality of nodes to receive said commands in the same order.

10. The apparatus of claim 9, wherein each of said synchronization structures further comprise a plurality of entries, each of said entries corresponding to one of said subset of nodes requiring access to said data item.

11. The apparatus of claim 10, wherein each of said entries further comprises a first bit indicating whether said corresponding node is requesting said data item, and a second bit indicating whether said corresponding node is modifying said data item.

12. The apparatus of claim 11, wherein said means for storing said synchronization structure further comprises:

means, at each node, for monitoring said data link for requests for said shared portion of said memory; and loopback means for monitoring said data link for requests to said shared portion of said memory by said requesting node.

13. The apparatus of claim 12, wherein said means for storing said synchronization structure further comprises:

means, responsive to a request from one of said nodes being returned to said node by said loopback means, for updating said synchronization structure of said node to indicate that said node is requesting access to said corresponding data item; and means, coupled to said synchronization structure, for allowing said node requesting access to said data item to access said data item responsive to said updating of said synchronization structure by said loopback means and further responsive to said first and second bits of each of said entries indicating that no other node of said plurality is currently requesting or owning said data item.

14. A method for providing shared memory in a multi-processor system comprising a plurality of nodes coupled by a bus, the method comprising the steps of:

allocating a portion of a memory at each of said nodes of said muLltiprocessor system, each allocated portion of memory to be shared for storing a plurality of data items, each of said data items accessible for reading and writing by said plurality of nodes; and each of said nodes selectively issuing updates to data items stored in said allocated and shared portions of memory to other nodes of said plurality by issuing less than all existing updates to data items over said bus, such that the shared memory is selectively updated.

15. The method according to claim 14, wherein said step of selectively issuing further comprises the steps of:

modifying a portion of shared data in memory; and responsive to the completion of said modification step, issuing over said data link only those updates to said shared portion of memory that reflect the final contents of said modified portion of shared memory.

16. A multi-processor computer system comprising a plurality of nodes coupled by a data link, each node of the plurality of nodes comprising a memory, a portion of each memory of each node shared for reads and updates of data items by said nodes, each of said nodes operating responsive to instructions, said multi-processor computer system comprising:

an instruction, stored in each of said memories of each of said nodes, for selectively enabling the issuance of updates of data items stored in said shared portions of memory, such that less than all existing updates of data items are issued over said data link, thereby selectively updating said shared portions of memory.

17. A computer readable medium capable of being accessed by a processing system coupled to a plurality of nodes, the computer readable medium comprising a local portion, accessible only by the processing system, and a shared portion for storing at least one data item capable of being accessed by the plurality of nodes, the shared portion of the computer readable medium comprising:

at least one multinodal synchronization data structure corresponding to the at least one data item, the at least one multinodal synchronization data structure comprising an entry for each one of the plurality of nodes capable of accessing the at least one data item and being shared by each of the nodes, such that access of the at least one data item by multiple nodes is enabled while ensuring recoverable communication in the processing system.

18. The computer readable medium according to claim 17, wherein the entry of the at least one synchronization structure comprises a first bit for indicating whether the corresponding one of the plurality of nodes capable of accessing the data item requires access to the data item and a second bit for indicating whether the corresponding one of the plurality of nodes capable of accessing the data item has current access to the data item.

* * * * *